United States Patent
Cheng

(10) Patent No.: US 11,222,193 B2
(45) Date of Patent: Jan. 11, 2022

(54) SIGNAL DETECTION METHOD AND ELECTRONIC DEVICE

(71) Applicant: BEIJING XIAOMI MOBILE SOFTWARE CO., LTD., Beijing (CN)

(72) Inventor: Chih-jen Cheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/829,710

(22) Filed: Mar. 25, 2020

(65) Prior Publication Data
US 2021/0165992 A1 Jun. 3, 2021

(30) Foreign Application Priority Data
Nov. 29, 2019 (CN) .......................... 201911205670.6

(51) Int. Cl.
*G06K 9/00* (2006.01)
*G06F 3/042* (2006.01)
*G06F 3/041* (2006.01)
*G06F 21/32* (2013.01)

(52) U.S. Cl.
CPC ....... *G06K 9/00033* (2013.01); *G06F 3/0412* (2013.01); *G06F 3/0421* (2013.01); *G06F 21/32* (2013.01)

(58) Field of Classification Search
CPC .......... G06K 9/00033; G06K 9/0004; G06F 3/0412; G06F 3/0421; G06F 21/32
See application file for complete search history.

(56) References Cited

U.S. PATENT DOCUMENTS

| | | | |
|---|---|---|---|
| 2012/0313913 A1* | 12/2012 | Shiraki | G06F 3/0412 345/207 |
| 2018/0211079 A1 | 7/2018 | Liu et al. | |
| 2019/0114458 A1 | 4/2019 | Cho et al. | |
| 2019/0294850 A1* | 9/2019 | Cao | G06K 9/0004 |
| 2019/0362127 A1* | 11/2019 | Chien | G06K 9/0004 |
| 2020/0218871 A1* | 7/2020 | Jhang | G06K 9/0008 |

OTHER PUBLICATIONS

Extended European Search Report of counterpart EP Application No. 20201123.5 dated Mar. 23, 2021, (11 p).

* cited by examiner

*Primary Examiner* — Stephen G Sherman
(74) *Attorney, Agent, or Firm* — Arch & Lake LLP

(57) ABSTRACT

A signal detection method applied in an electronic device includes: resetting each optical sensor at a first time point; collecting a first signal output by the optical sensor at the first time point, a second signal output by the optical sensor at a second time point, a third signal output by the optical sensor at a third time point, and a fourth signal output by the optical sensor at a fourth time point; obtaining a first difference value between the first signal and the second signal and a second difference value between the third signal and the fourth signal, and determining a sum of the first difference value and the second difference value as a signal variation amount in a current cycle. Also disclosed are an associated electronic device and a non-transitory computer readable storage medium.

10 Claims, 8 Drawing Sheets

SIGNAL DETECTION METHOD AND ELECTRONIC DEVICE

CROSS-REFERENCE TO RELATED APPLICATION

This application claims priority to Chinese Patent Application 201911205670.6, filed Nov. 29, 2019, the entire contents of which are incorporated herein by reference.

TECHNICAL FIELD

The present disclosure relates to the field of electronic technology, and more particularly to a signal detection method and an electronic device.

BACKGROUND

With the development of electronic technology and the widespread use of fingerprint identification technology, an under-screen fingerprint identification technology is currently proposed to perform fingerprint identification according to image information above a display screen, the image information being collected below the display screen by utilizing the characteristic that ultrasonic waves and light can penetrate through the display screen.

A liquid crystal display (LCD) screen is a common display screen. In related technologies, an optical sensor is provided below the LCD screen to detect a light signal above the LCD screen and obtain a signal variation amount above the LCD screen, the variation amount being used to represent the image information above the LCD screen, so that fingerprint identification can be performed according to the variation amount.

SUMMARY

Embodiments of the present disclosure provide a signal detection method and an electronic device, such that the problem that the signal variation amount cannot be accurately collected in related technologies can be solved. The technical solutions provided by embodiments of the present disclosure are as follows:

In a first aspect of the present disclosure, a signal detection method applied in an electronic device is provided. A display screen of the electronic device includes a plurality of pixels and a plurality of optical sensors, and positions of the plurality of pixels correspond to positions of the plurality of optical sensors one to one. The method includes: resetting each optical sensor at a first time point; collecting a first signal output by the optical sensor at the first time point, a second signal output by the optical sensor at a second time point, a third signal output by the optical sensor at a third time point, and a fourth signal output by the optical sensor at a fourth time point; obtaining a first difference value between the first signal and the second signal and a second difference value between the third signal and the fourth signal, and determining a sum of the first difference value and the second difference value as a signal variation amount in a current cycle; wherein the first time point is a starting time point of the current cycle, and the fourth time point is an ending time point of the current cycle; the second time point is a time point in the current cycle before a pixel corresponding to the position of the optical sensor displays; and the third time point is a time point in the current cycle after the pixel displays.

In a second aspect of the present disclosure, an electronic device is provided. The electronic device includes: a display screen, the display screen comprising a plurality of pixels and a plurality of optical sensors, and positions of the plurality of pixels corresponding to positions of the plurality of optical sensors one to one. The electronic device further includes: one or more processors; a non-transitory storage coupled to the one or more processors. A plurality of programs are stored in the non-transitory storage that. When executed by the one or more processors, the plurality of programs cause the electronic device to: reset each optical sensor at a first time point; collect a first signal output by the optical sensor at the first time point, a second signal output by the optical sensor at a second time point, a third signal output by the optical sensor at a third time point, and a fourth signal output by the optical sensor at a fourth time point; and obtain a first difference value between the first signal and the second signal and a second difference value between the third signal and the fourth signal, and determine a sum of the first difference value and the second difference value as a signal variation amount in a current cycle. The first time point is a starting time point of the current cycle, and the fourth time point is an ending time point of the current cycle; the second time point is a time point in the current cycle before a pixel corresponding to the position of the optical sensor displays; and the third time point is a time point in the current cycle after the pixel displays.

In a third aspect the present disclosure, a signal detection method applied in an electronic device is provided. A display screen of the electronic device includes a plurality of pixels and a plurality of optical sensors, and positions of the plurality of pixels correspond to positions of the plurality of optical sensors one to one. The method includes: resetting each optical sensor at a first time point; collecting a first signal output by the optical sensor at the first time point, and a second signal output by the optical sensor at a second time point; resetting the optical sensor at a fifth time point; collecting a fourth signal output by the optical sensor at a fourth time point; and obtaining a first difference value between the first signal and the second signal and a second difference value between the first signal and the fourth signal, and determining a sum of the first difference value and the second difference value as a signal variation amount in a current cycle. The first time point is a starting time point of the current cycle, and the fourth time point is an ending time point of the current cycle; the second time point is a time point in the current cycle before a pixel corresponding to the position of the optical sensor displays; and the fifth time point is a time point in the current cycle after the pixel displays.

In a fourth aspect of the present disclosure, an electronic device is provided. The electronic device includes a display screen comprising a plurality of pixels and a plurality of optical sensors, positions of the plurality of pixels in one-to-one accordance with positions of the plurality of optical sensors; one or more processors; a non-transitory storage coupled to the one or more processors; and a plurality of programs stored in the non-transitory storage that, when executed by the one or more processors, cause the electronic device to: reset each optical sensor at a first time point; collect a first signal output by the optical sensor at the first time point, and a second signal output by the optical sensor at a second time point; reset the optical sensor at a fifth time point; collect a fourth signal output by the optical sensor at a fourth time point; and obtain a first difference value between the first signal and the second signal and a second difference value between the first signal and the fourth signal, and determine a sum of the first difference value and the second difference value as a signal variation amount in a current cycle. The first time point is a starting time point of the current cycle, the fourth time point is an ending time point of the current cycle, the second time point is a time point in the current cycle before a pixel corresponding to the position of the optical sensor displays, and the fifth time point is a time point in the current cycle after the pixel displays.

In a fifth aspect of the present disclosure, provided is a non-volatile computer-readable storage medium storing a plurality of programs for execution by an electronic device having a display screen and one or more processors, wherein the display screen comprises a plurality of pixels and a plurality of optical sensors, positions of the plurality of pixels in one-to-one accordance with positions of the plurality of optical sensors, and the plurality of programs, when executed by the one or more processors, cause the electronic device to perform acts comprising: resetting each optical sensor at a first time point; collecting a first signal output by the optical sensor at the first time point, a second signal output by the optical sensor at a second time point, a third signal output by the optical sensor at a third time point, and a fourth signal output by the optical sensor at a fourth time point; and obtaining a first difference value between the first signal and the second signal and a second difference value between the third signal and the fourth signal, and determining a sum of the first difference value and the second difference value as a signal variation amount in a current cycle. The first time point is a starting time point of the current cycle, the fourth time point is an ending time point of the current cycle, the second time point is a time point in the current cycle before a pixel corresponding to the position of the optical sensor displays, and the third time point is a time point in the current cycle after the pixel displays.

In a sixth aspect of the present disclosure, provided is a non-volatile computer-readable storage medium storing a plurality of programs for execution by an electronic device having a display screen and one or more processors, wherein the display screen comprises a plurality of pixels and a plurality of optical sensors, positions of the plurality of pixels in one-to-one accordance with positions of the plurality of optical sensors, and the plurality of programs, when executed by the one or more processors, cause the electronic device to perform acts comprising: resetting each optical sensor at a first time point; collecting a first signal output by the optical sensor at the first time point, and a second signal output by the optical sensor at a second time point; resetting the optical sensor at a fifth time point; collecting a fourth signal output by the optical sensor at a fourth time point; and obtaining a first difference value between the first signal and the second signal and a second difference value between the first signal and the fourth signal, and determining a sum of the first difference value and the second difference value as a signal variation amount in a current cycle. The first time point is a starting time point of the current cycle, the fourth time point is an ending time point of the current cycle, the second time point is a time point in the current cycle before a pixel corresponding to the position of the optical sensor displays, and the fifth time point is a time point in the current cycle after the pixel displays.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure will be described in further detail with reference to the accompanying drawings, to present the objects, technical solutions, and advantages of the present disclosure more dearly.

Since the LCD screen also has a display function, the phenomenon of signal coupling may occur between devices inside the LCD screen when fingerprint identification is performed during the display process, which may cause errors in the collected signal variation amount and thereby affect the accuracy of fingerprint identification.

Figure 1:
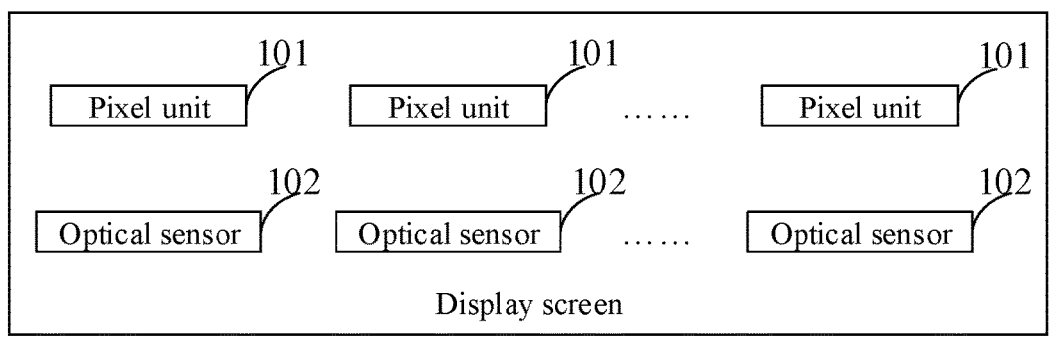
FIG. 1 is a schematic diagram of a structure of a display screen of an electronic device according to an exemplary embodiment.

FIG. 1 is a schematic diagram of a structure of a display screen of an electronic device according to an exemplary embodiment. As shown in FIG. 1, the display screen of the electronic device includes a plurality of pixel units (pixels) 101 and a plurality of optical sensors 102, and positions of the plurality of pixel units 101 correspond to the positions of the plurality of optical sensors 102 one to one.

Figure 2:
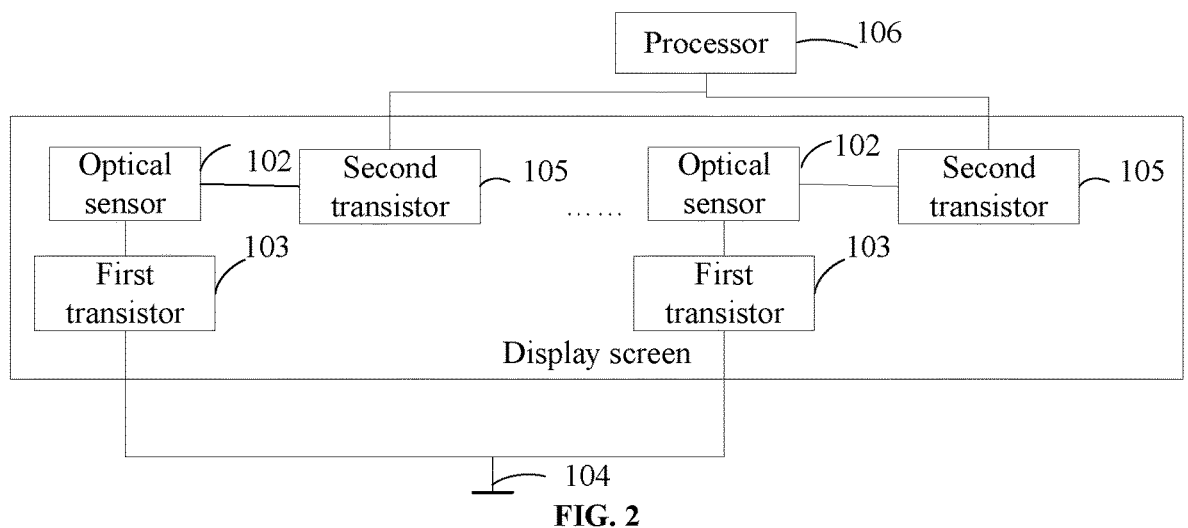
FIG. 2 is a schematic diagram of a structure of a display screen of another electronic device according to an exemplary embodiment.

In one embodiment, referring to FIG. 2, the display screen further includes a plurality of first transistors 103. Each optical sensor 102 is connected to a first transistor 103, and each first transistor 103 is connected to a power supply terminal 104.

By controlling the first transistor 103 to be turned on or off, the connection between the optical sensor 102 and the power supply terminal 104 can be controlled, which can thereby control the optical sensor 102 to operate or not. When the first transistor 103 is turned on, the power supply terminal 104 may output a signal to the optical sensor 102 to reset the optical sensor 102.

In another embodiment, referring to FIG. 2, the display screen further includes a plurality of second transistors 105 and a processor 106. Each optical sensor 102 is connected to a second transistor 105, and each first transistor 105 is connected to the processor 106.

By controlling the second transistor 105 to be turned on or off, the connection between the optical sensor 102 and the processor 106 can be controlled, so that the processor 106 can be controlled to collect or not collect the signal output by the optical sensor 102. When the second transistor 105 is turned on, the optical sensor 102 outputs a signal to the processor 106, and the processor 106 collects the signal at the current time point.

Figure 3:
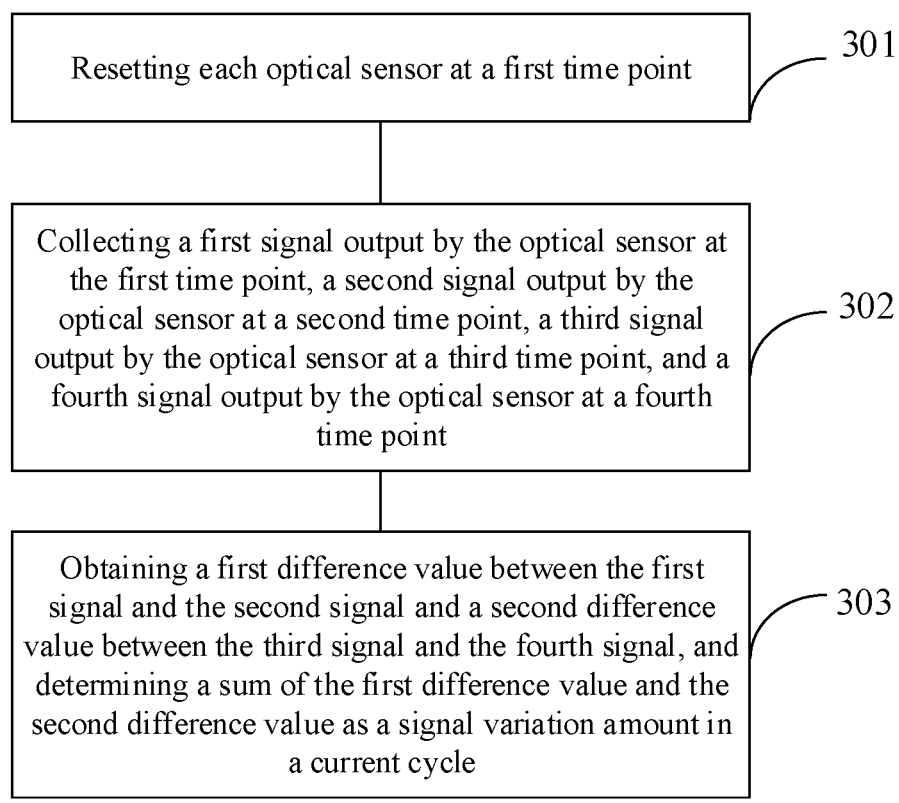
FIG. 3 is a flow chart of a signal detection method according to an exemplary embodiment.

FIG. 3 is a flow chart of a signal detection method according to an exemplary embodiment. The method is applied in the electronic device, and the structure of the display screen of the electronic device is as shown in FIG. 1. The method includes following steps.

In step 301, each optical sensor is reset at a first time point.

In step 302, a first signal output by the optical sensor at the first time point, a second signal output by the optical sensor at a second time point, a third signal output by the optical sensor at a third time point, and a fourth signal output by the optical sensor at a fourth time point are collected.

In step 303, a first difference value between the first signal and the second signal and a second difference value between the third signal and the fourth signal are obtained, and a sum of the first difference value and the second difference value is determined as a signal variation amount in a current cycle.

Herein, the first time point is a starting time point of the current cycle, and the fourth time point is an ending time point of the current cycle; the second time point is a time point in the current cycle before a pixel unit corresponding to the position of the optical sensor performs display; and the third time point is a time point in the current cycle after the pixel unit performs display.

The optical sensor is a device that converts an optical signal into an electrical signal. When the optical signal is irradiated to the optical sensor, the status of the optical sensor is changed after absorbing the energy transmitted by the optical signal, and a corresponding electrical effect is generated, thereby causing changes to the output electrical signal.

Therefore, the electronic device periodically collects the signals output by the optical sensor, and sums the signal variation amount output by the optical sensor in each cycle (or each period). The signal variation amount can reflect the variation of the optical signal in the corresponding cycle (or period).

Herein, the cycle (or period) adopted by the electronic device may be set to be equal to or smaller than the display cycle of the display screen, or may be set as other cycles. The display cycle of the display screen refers to a duration required by the display screen to completely display multiple lines of pixel units in a progressive scanning mode.

In the related technology, the signals output by the optical sensor are usually collected at the starting time point and the ending time point of each cycle, and the difference value between the signals collected at the two time points is obtained and determined as the signal variation amount in the corresponding cycle. However, for each optical sensor, the optical sensor is located below the display screen and corresponds to the position of the pixel unit. Thus, when the pixel unit performs display, the pixel unit shall be charged through the signal line, which may cause signal coupling to the optical sensor in the process, thereby causing errors in the signal output by the optical sensor and affecting the accuracy of fingerprint identification.

Therefore, in the embodiment of the present disclosure, for each cycle, taking the first time point as an example of the starting time point and the fourth time point as the ending time point of the current cycle, a second time point and a third time point in the current cycle are added in addition to the first time point and the fourth time point as time points for collecting the signals, so as to avoid the problem of signal coupling.

That is, the first signal output by the optical sensor at the first time point, the second signal output by the optical sensor at the second time point, the third signal output by the optical sensor at the third time point, and the fourth signal output by the optical sensor at the fourth time point are collected. The first difference value between the first signal and the second signal and the second difference value between the third signal and the fourth signal are obtained; and the sum of the first difference value and the second difference value is determined as the signal variation amount in the current cycle.

In the method provided by the embodiment of the present disclosure, the first signal output by the optical sensor at the first time point, the second signal output by the optical sensor at the second time point, the third signal output by the optical sensor at the third time point, and the fourth signal output by the optical sensor at the fourth time point are collected by resetting each optical sensor at the first time point. Because the first time point and the second time point are both located before the pixel unit corresponding to the position of the optical sensor performs display, the collected first signal and second signal have no error. The third time point and the fourth time point are both located after the pixel unit corresponding to the position of the optical sensor performs display, so that the fourth signal and the third signal can mutually offset errors caused by the phenomenon of signal coupling. Hence, a first difference value between the first signal and the second signal and a second difference value between the third signal and the fourth signal are obtained, and the sum of the first difference value and the second difference value can represent the variation situation of the optical signal detected by the optical sensor in the current cycle. Therefore, the sum of the first difference value and the second difference value is determined as the signal variation amount in the current cycle, so that errors in the collected signal variation amount can be avoided, and accuracy of the signal detection can be improved, which thereby improves the accuracy of fingerprint identification.

In one embodiment, the method includes: resetting the optical sensor at a fifth time point, the fifth time point, which is after the pixel unit performs display, is a time point before the third time point in the present current cycle.

In one embodiment, the display screen further includes a first transistor, the optical sensor being connected to the first transistor, and the first transistor being connected to a power supply terminal; and resetting the optical sensor at the first time point includes:

controlling the first transistor to be turned on at the first time point, so that the power supply terminal outputs a signal to the optical sensor to reset the optical sensor.

In one example, the display screen further includes a second transistor and a processor, the optical sensor being connected to the second transistor, and the first transistor being connected to the processor.

Collecting the first signal output by the optical sensor at the first time point, the second signal output by the optical sensor at the second time point, the third signal output by the optical sensor at the third time point, and the fourth signal output by the optical sensor at the fourth time point includes:

controlling the second transistor to be turned on at the first time point, the second time point, the third time point and the fourth time point, so that the optical sensor outputs a signal to the processor, and the processor collects a signal at the current time point.

In one embodiment, after obtaining the first difference value between the first signal and the second signal and the second difference value between the third signal and the fourth signal, and determining the sum of the first difference value and the second difference value as the signal variation amount in the current cycle, the method further includes:

determining that the fingerprint identification succeeds when the difference value between the signal variation amount and a preset variation amount of an input fingerprint is smaller than a preset threshold value; and determining that the fingerprint identification fails when the difference value between the signal variation amount and the preset variation amount is not smaller than the preset threshold value.

Figure 4:
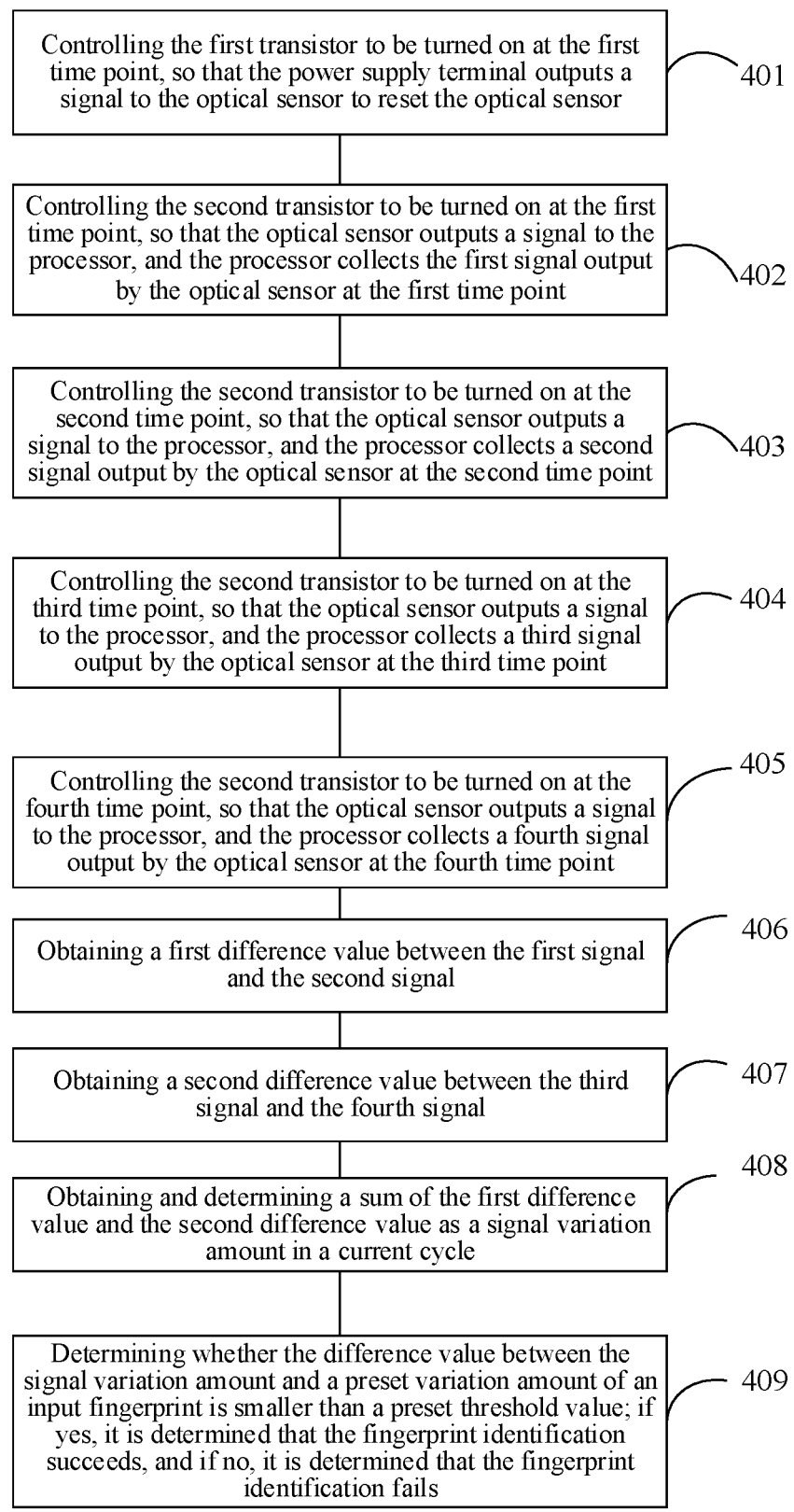
FIG. 4 is a flow chart of another signal detection method according to an exemplary embodiment.

FIG. 4 is a flow chart of another signal detection method according to an exemplary embodiment. The method is applied in the electronic device, and the structure of the display screen of the electronic device is as shown in FIG. 2. The method includes following steps.

In step 401, the first transistor is controlled to be turned on at the first time point, so that the power supply terminal outputs a signal to the optical sensor to reset the optical sensor.

In the embodiment of the present disclosure, the electronic device periodically collects the signal output by the optical sensor. Taking the first time point as an example of the starting time point of the current cycle, since the signal output by the optical sensor shall be collected at the first time point, the optical sensor is reset at the first time point, so that the optical sensor can start to operate.

In one embodiment, referring to FIG. 2, the optical sensor is connected to the first transistor, and the first transistor is connected to the power supply terminal, the power supply terminal being configured to supply a voltage signal. The first transistor, which is a variable current switch, is capable of controlling an output current based on an input voltage. By controlling the first transistor to be turned on or off, the connection between the optical sensor and the power supply terminal can be controlled, which can thereby control the optical sensor to operate or not. Thus, the first transistor is controlled to be turned on at the first time point. At this point, the power supply terminal is connected to the optical sensor, and outputs a signal to the optical sensor to reset the optical sensor.

The first transistor may be a triode or a complementary metal oxide semiconductor (MOS) transistor, or other types of transistor.

Figure 5:
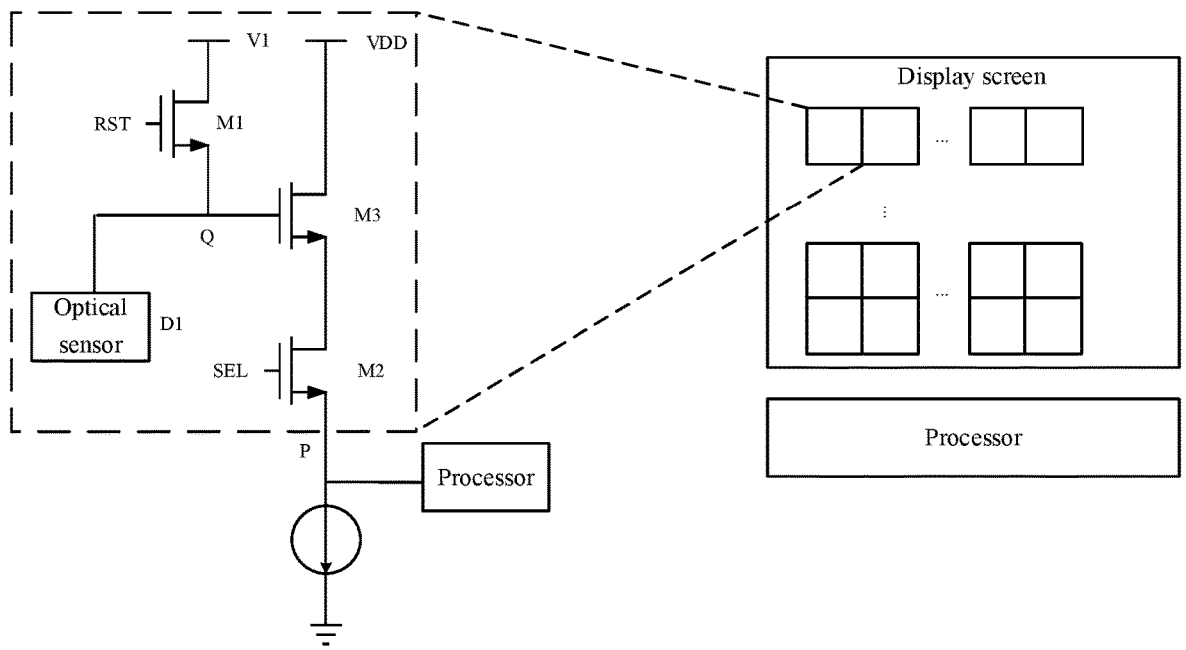
FIG. 5 is a circuit diagram of a display screen of an electronic device according to an exemplary embodiment.

Referring to FIG. 5, the voltage at the power supply terminal is V1, the first transistor is an N-channel field effect transistor M1, the optical sensor is D1, and the output terminal of the optical sensor is Q point. Wherein the power supply terminal is connected to a drain electrode of the first transistor, and the source electrode of the first transistor is connected to the output terminal of the optical sensor. Thus, a gate electrode of the first transistor is pulled up at the first time point to control the first transistor to be turned on.

It should be noted that the step 401 is an optional step. The electronic device may reset the optical sensor through the step 401 or may reset the optical sensor by other manners.

In step 402, the second transistor is controlled to be turned on at the first time point, so that the optical sensor outputs a signal to the processor, and the processor collects the first signal output by the optical sensor at the first time point.

In one embodiment, the electronic device may further collect the signal output by the optical sensor at the first time point as the first signal.

In one embodiment, referring to the FIG. 2, the optical sensor is connected to the second transistor, and the second transistor is connected to the processor. The connection between the optical sensor and the processor can be controlled by controlling the on or off of the second transistor, thereby controlling the processor to operate or not. Thus, the second transistor is controlled to be turned on at the first time point. At this point, the optical sensor is connected to the processor and outputs a signal to the processor, and the processor collects the current signal as the first signal.

Referring to FIG. 5, the second transistor is an N-channel field effect transistor M2. An output terminal of the optical sensor is connected to a drain electrode of the second transistor, and a source electrode of the second transistor is connected to an input terminal of the processor. Thus, a gate electrode of the second transistor is pulled up at the first time point to control the second transistor to be turned on.

Furthermore, referring to FIG. 5, the electronic device further includes a third transistor. The third transistor is an N-channel field effect transistor M3. The output terminal of the optical sensor may also be connected to a gate electrode of the third transistor, a drain electrode of the third transistor is connected to the other power supply terminal, and a source electrode of the third transistor is connected to the drain electrode of the second transistor. The second transistor is a follower. When the first transistor is turned on, the voltage of the source electrode of the first transistor is increased, and the gate electrode of the third transistor is pulled up, so that the third transistor is turned on.

In addition, after the first signal is collected at the first time point, the gate electrodes of the first transistor and second transistor can be pulled down to control the first transistor and the second transistor to be turned off. At this point, the processor does not collect signals temporarily, and the optical sensor can receive light and accumulate charges. Along with the accumulation of electricity, the signals output by the optical sensor may change correspondingly, and the more the charges are accumulated, the smaller the voltage of the signals output by the optical sensor is.

The time point for controlling the first transistor and the second transistor to be turned off may be a time point with a preset duration after the first time point, and the preset duration can be a preset unit duration or a shorter duration.

In step 403, the second transistor is controlled to be turned on at the second time point, so that the optical sensor outputs a signal to the processor, and the processor collects a second signal output by the optical sensor at the second time point.

The second time point is after the first time point and is a time point in the current cycle before a pixel unit performs display, the pixel unit corresponding to the position of the optical sensor. At this point, since the pixel unit has not yet performed display, the process of the optical sensor detecting the light signal and accumulating the charges has not been affected by the pixel unit, and there is no error in the output signal.

Thus, the second transistor is controlled to be turned on at the second time point. At this point, the optical sensor is connected to the processor and outputs a signal to the processor, and the processor collects the current signal as the second signal.

In addition, after the second signal is collected at the second time point, the gate electrode of the second transistor can be pulled down to control the second transistor to be turned off. At this point, the processor does not collect the signal temporarily. The time point for controlling the second transistor to be turned off may be a time point with a preset duration after the second time point, and the preset duration can be a preset unit duration or a smaller duration.

In step 404, the second transistor is controlled to be turned on at the third time point, so that the optical sensor outputs a signal to the processor, and the processor collects a third signal output by the optical sensor at the third time point.

The third time point is after the second time point and is a time point in the current cycle after the pixel unit performs display. At this point, since the pixel unit has performed display, the process of the optical sensor detecting the light signal and accumulating the charges may be affected by the pixel unit, and errors may occur to the output signal.

Thus, the second transistor is controlled to be turned on at the third time point. At this point, the optical sensor is connected to the processor and outputs a signal to the processor, and the processor collects the current signal as the third signal.

In addition, after the third signal is collected at the third time point, the gate electrode of the second transistor can be pulled down to control the second transistor to be turned off. At this point, the processor does not collect the signal temporarily. The time point for controlling the second transistor to be turned off may be a time point with a preset duration after the third time point, and the preset duration can be a preset unit duration or a smaller duration.

It should be noted that the second time point may be any time point in a period from the first time point to a time point when the pixel unit performs display, and the third time point may be any time point in a period from the time point when the pixel unit performs display to the fourth time point.

In step 405, the second transistor is controlled to be turned on at the fourth time point, so that the optical sensor outputs a signal to the processor, and the processor collects a fourth signal output by the optical sensor at the fourth time point.

The fourth time point is located after the third time point, and is an ending time point of the current cycle. At this point, since the pixel unit has performed display, the process of the optical sensor detecting the light signal and accumulating the charges may be affected by the pixel unit, and errors may occur to the output signal.

Thus, the second transistor is controlled to be turned on at the fourth time point. At this point, the optical sensor is connected to the processor and outputs a signal to the processor, and the processor collects the current signal as the fourth signal.

In addition, after the fourth signal is collected at the fourth time point, the gate electrode of the second transistor can be pulled down to control the second transistor to be turned off. At this point, the processor does not collect the signal temporarily. The time point for controlling the second transistor to be turned off may be a time point with a preset duration after the fourth time point, and the preset duration can be a preset unit duration or a smaller duration.

In step 406, a first difference value between the first signal and the second signal is obtained.

The first time point and the second time point are both located before the pixel unit corresponding to the position of the optical sensor performs display, and the pixel unit does not generate signal coupling with the optical sensor. Thus, no error occurs to the collected first signal and second signal, and the first difference value between the second signal and the first signal can be directly obtained, and the first differ-ence value is a signal variation amount of the optical sensor in a period from the first time point to the second time point.

In step 407, a second difference value between the third signal and the fourth signal is obtained.

The third time point and the fourth time point are located after the pixel unit corresponding to the position of the optical sensor performs display, and the pixel unit has generated signal coupling with the optical sensor. Thus, same errors may occur to the collected third signal and fourth signal, and the second difference value between the second signal and the first signal, which is directly obtained, can offset the errors caused by the signal coupling, and the second difference value is a signal variation amount of the optical sensor in a period from the third time point to the fourth time point.

It should be noted that steps 406-407 are executed after steps 402-405 only in this embodiment of the present disclosure. In another embodiment, step 406 can be executed after steps 402-403, step 407 can be executed after steps 404-405, or steps 406 and 407 can be executed simultaneously after steps 402-405.

In step 408, a sum of the first difference value and the second difference value is obtained and determined as a signal variation amount in a current cycle.

Since the optical sensor is accumulating charges in the current cycle, and the output voltage is changing, the sum of the first difference value and the second difference value is obtained to represent the signal variation amount of the optical sensor in the period from the first time point to the fourth time point.

It should be noted that the embodiments of the present disclosure are only described with respect to the signal collection manner in one cycle. In practical applications, since two or more cycles may be required for one fingerprint identification, the method provided by the embodiments of the present disclosure may be adopted to perform detection in two or more cycles. Alternatively, the method provided by the embodiments of the present disclosure may be adopted to perform detection in each cycle. For example, after the method provided by the embodiments of the present disclosure is adopted for detection when a user inputs a fingerprint on a display screen, the detected signal variation amount of the current cycle is stored, so that when the user wants to use the electronic device and needs to verify the fingerprint subsequently, the method provided by the embodiments of the present disclosure may further be adopted to perform detection.

In step 409, it is determined whether the difference value between the signal variation amount and a preset variation amount of an input fingerprint is smaller than a preset threshold value; if yes, it is determined that the fingerprint identification succeeds, and if no, it is determined that the fingerprint identification fails.

In the embodiments of the present disclosure, changes may occur to the light signal received by the optical sensor due to the difference in the user fingerprints, whereas the optical sensor can detect the changes of the light signal. By utilizing this characteristic, the detected signal variation amount can be applied to the fingerprint identification process.

When fingerprint identification is performed, a preset variation amount of the input fingerprint is obtained. The preset variation amount refers to a signal variation amount generated in a cycle when the input fingerprint covers the display screen and above the optical sensor. Therefore, when the user currently covers the finger on the display screen and above the optical sensor, if the difference between the detected signal variation amount and the preset variation amount is small enough, the current fingerprint can be considered to match the input fingerprint, and the fingerprint identification succeeds.

Hence, it is determined whether difference value between the signal variation amount and the preset variation amount is smaller than the preset threshold value or not. Herein, the preset threshold value can be determined according to the accuracy requirement of the fingerprint identification.

If the difference value between the signal variation amount and the preset variation amount is smaller than the preset threshold value, it indicates that the difference between the signal variation amount and the preset variation amount is small, and the current fingerprint matches the input fingerprint, so the fingerprint identification succeeds. Alternatively, if the difference value between the signal variation amount and the preset variation amount is not smaller than the preset threshold value, it indicates that the difference between the signal variation amount and the preset variation amount is great, and the current fingerprint does not match the input fingerprint, so the fingerprint identification fails.

In addition, when the user inputs the fingerprint before, the user covers the finger on the display screen and above the optical sensor. The signal detection is then performed in a cycle to use the collected signal variation amount as the preset variation amount and store it in the electronic device. Moreover, the signal detection process is similar to steps 401-408 described above, and will not be described herein again.

In one embodiment, the electronic device can record the identification result obtained each time the fingerprint identification is performed. When the identification result continuously exceeding the preset number of times is that the fingerprint identification fails, the electronic device is locked, or the user is required to enter the password of the electronic device.

It should be noted that the display screen may include a plurality of optical sensors and a plurality of pixel units, and the steps 401-409 may be executed for each optical sensor, and the executing process is similar and will not be described herein again. For example, when fingerprint identification is performed, the signal variation amount corresponding to each optical sensor may be comprehensively considered to determine whether the fingerprint identification succeeds or not.

Another point that should be noted is that the embodiment of the present disclosure is only described by taking the electronic device as an example of the execution body. In fact, the electronic device may include a processor, and the steps 401 to 409 may be executed by the processor, or may also be executed by other devices in the electronic device. For example, the processor is connected to the gate electrodes of the first and third transistors, so as to control the on or off of the first and third transistors. Alternatively, the electronic device may further include another control module, and the steps 401 to 409 may be executed by the control module. For example, the control module is connected to the gate electrodes of the first and third transistors, so as to control the on or off of the first and third transistors.

Figure 6:
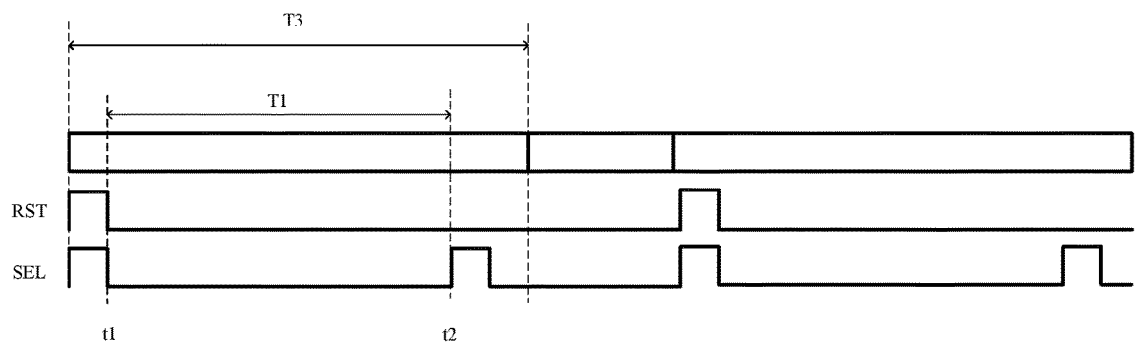
FIG. 6 is a schematic diagram of a signal timing sequence shown in the related art.
Figure 7:
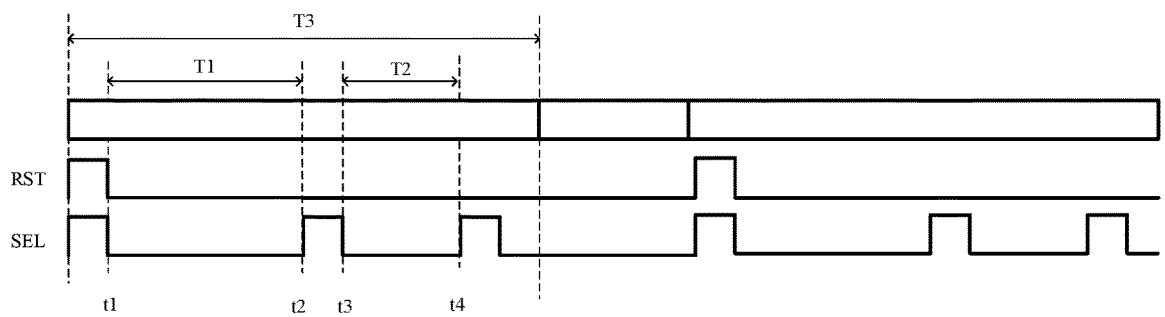
FIG. 7 is a schematic diagram of a signal timing sequence according to an embodiment of the present disclosure.

FIG. 6 is a schematic diagram of a signal timing sequence shown in the related art, and FIG. 7 is a schematic diagram of a signal timing sequence according to an embodiment of the present disclosure.

Referring to FIG. 6, T1 represents a period in a period of collecting the signal variation amount; RST (reset) represents the gate voltage of the first transistor, and SEL (select) represents the gate voltage of the second transistor. FIG. 6 shows a period T3 during which the display screen performs display in one period and variation of the gate voltage of the first transistor and gate voltage of the second transistor in the related art. The signals output by the optical sensor are respectively collected at a starting time point T1 and an ending time point T2 of T1 to obtain the signal variation amount.

Referring to FIGS. 7, T1 and T2 represent two periods in a period of collecting the signal variation amount; RST represents the gate voltage of the first transistor, and SEL represents the gate voltage of the second transistor. FIG. 7 shows a period T3 during which the display screen performs display in one period and variation of gate voltage of the first transistor and gate voltage of the second transistor in the embodiment of the present disclosure. In addition, signals output by the optical sensor are collected at a starting time point (a first time point) t1 of T1, a second time point t2 before the pixel unit corresponding to the optical sensor performs display, a third time point t3 after the pixel unit corresponding to the optical sensor performs display, and an ending time point (a fourth time point) t4, respectively, so as to obtain the signal variation amount.

In the method provided by the embodiment of the present disclosure, the first signal output by the optical sensor at the first time point, the second signal output by the optical sensor at the second time point, the third signal output by the optical sensor at the third time point, and the fourth signal output by the optical sensor at the fourth time point are collected by resetting each optical sensor at the first time point. Because the first time point and the second time point are both located before the pixel unit corresponding to the position of the optical sensor performs display, the collected first signal and second signal have no error. The third time point and the fourth time point are both located after the pixel unit corresponding to the position of the optical sensor performs display, so that the fourth signal and the third signal can mutually offset errors caused by the phenomenon of signal coupling. Hence, a first difference value between the first signal and the second signal and a second difference value between the third signal and the fourth signal are obtained, and the sum of the first difference value and the second difference value can represent the variation of the optical signal detected by the optical sensor in the current cycle. Therefore, the sum of the first difference value and the second difference value is determined as the signal variation amount in the current cycle, so that errors in the collected signal variation amount can be avoided, and accuracy of the signal detection can be improved, which thereby improves the accuracy of fingerprint identification.

Furthermore, a first transistor is controlled to be turned on to enable the power supply terminal to output a signal to the optical sensor and thereby reset the optical sensor. A second transistor is controlled to be turned on to enable the optical sensor to output a signal to the processor, so that the processor can collect the first signal output by the optical sensor at the first time point, the second signal output by the optical sensor at the second time point, the third signal output by the optical sensor at the third time point, and the fourth signal output by the optical sensor at the fourth time point. By controlling the time point of collecting the second signal and the third signal, errors in the signal variation amount can be offset, and the accurate signal variation amount can be obtained, which thereby improves the accuracy of signal detection.

In addition, the signal variation amount in the current cycle is compared with the preset variation amount of the recorded fingerprint to determine whether the fingerprint identification succeeds or not. Since the collected signal variation amount is accurate enough, the accuracy of the fingerprint identification and the safety of the electronic device can be improved.

On basis of the aforesaid embodiment, in another embodiment, the method after step 403 and before step 404 further includes: resetting the optical sensor at a fifth time point. The fifth time point, which is after the pixel unit performs display, is a time point before the third time point in the present current cycle.

A phenomenon of signal coupling may be generated to the optical sensor when the pixel unit performs display. Thus, the optical sensor can be reset at the fifth time that is after the pixel unit performs display, and at this point, the signal output by the optical sensor can be restored to the original signal, which is the same as the first signal. After that, the optical sensor may receive light and accumulate charges again on basis of the first signal, so that the signal output by the optical sensor will not be affected by the phenomenon of coupling.

Then, there will be no error in collecting the third signal output by the optical sensor at the third time point, and there will be no error in collecting the fourth signal output by the optical sensor at the fourth time point, either. Therefore, no error will be introduced when executing the steps 406-408, and the accuracy of the signal variation amount can be guaranteed.

Figure 8:
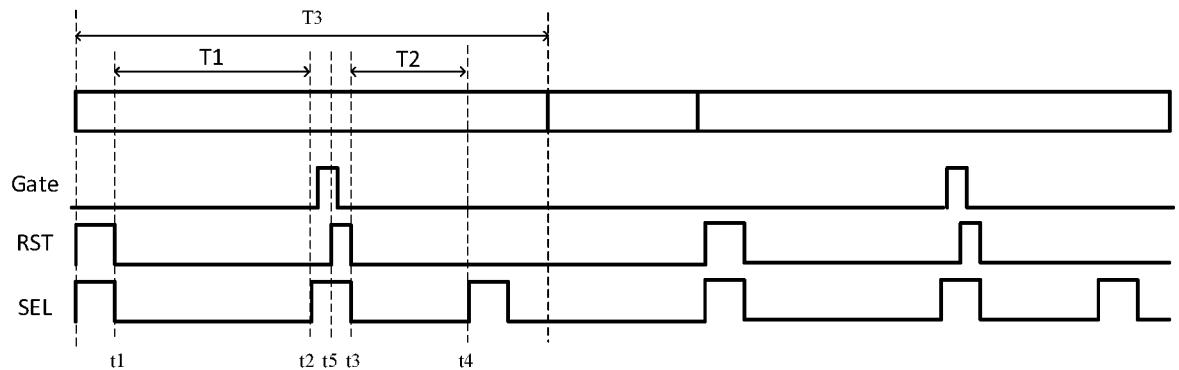
FIG. 8 is a schematic diagram of another signal timing sequence according to an embodiment of the present disclosure.

FIG. 8 is a schematic diagram of a signal timing sequence according to an embodiment of the present disclosure. Referring to FIGS. 8, T1 and T2 represent two periods in a period of collecting the signal variation amount; RST represents the gate voltage of the first transistor, and SEL represents the gate voltage of the second transistor. Gate represents the signal provided by the gate electrode signal line of the pixel unit corresponding to the optical sensor, and the pixel unit performs display during the period when the gate electrode signal is at high level. FIG. 8 shows a period T3 during which the display screen performs display in one period and variation of gate voltage of the first transistor and gate voltage of the second transistor in the embodiment of the present disclosure. In addition, signals output by the optical sensor are respectively collected at a starting time point (a first time point) t1 of T1, a second time point t2 before the pixel unit corresponding to the optical sensor performs display, a third time point t3 after the pixel unit corresponding to the optical sensor performs display, and an ending time point (a fourth time point) t4, and the optical sensor is reset at the fifth time point t5 between the second time point t2 and the third time point t3, thereby obtaining the signal variation amount.

Figure 9:
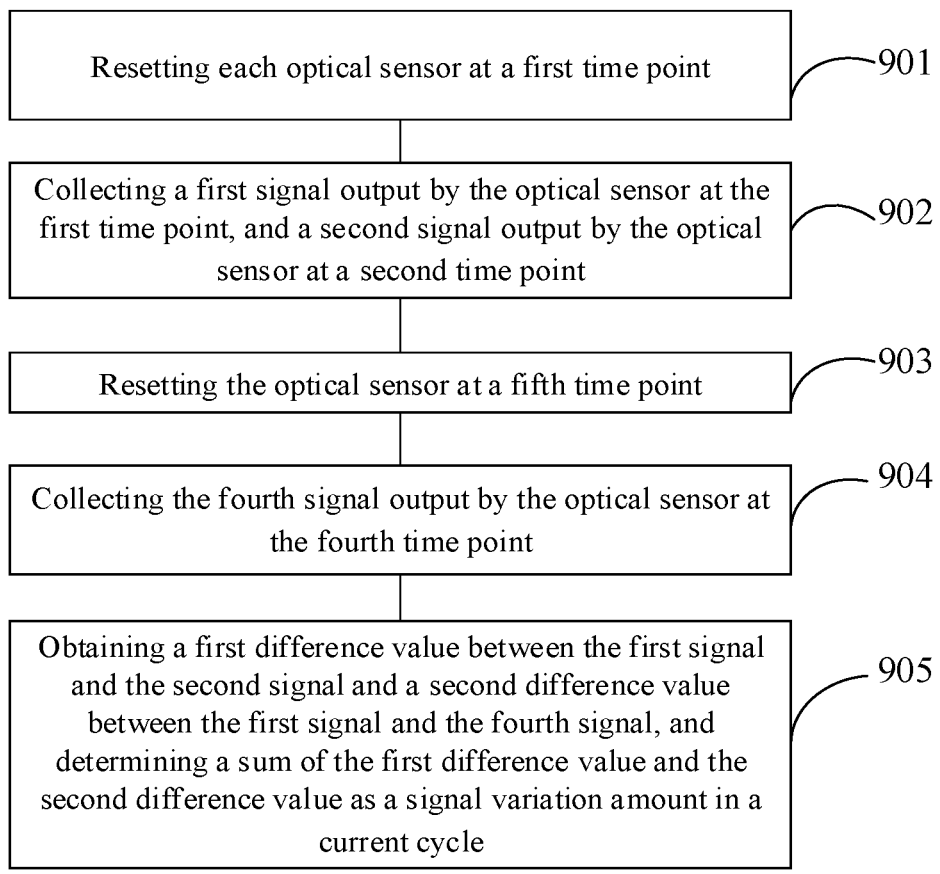
FIG. 9 is a flow chart of a signal detection method according to an exemplary embodiment.

FIG. 9 is a flow chart of a signal detection method according to an exemplary embodiment. The method is applied in the electronic device, and the structure of the display screen of the electronic device is as shown in FIG. 1. The method includes following steps.

In step 901, each optical sensor is reset at a first time point.

In step 902, a first signal output by the optical sensor at the first time point, and a second signal output by the optical sensor at a second time point are collected.

In step 903, the optical sensor is reset at a fifth time point.

In step 904, the fourth signal output by the optical sensor at the fourth time point is collected.

In step 905, a first difference value between the first signal and the second signal and a second difference value between the first signal and the fourth signal are obtained, and a sum of the first difference value and the second difference value is determined as a signal variation amount in a current cycle.

Herein, the first time point is a starting time point of the current cycle, and the fourth time point is an ending time point of the current cycle; the second time point is a time point in the current cycle before a pixel unit corresponding to the position of the optical sensor performs display; the third time point is a time point in the current cycle after the pixel unit performs display.

In the method provided by the embodiment of the present disclosure, the first signal output by the optical sensor at the first time point, the second signal output by the optical sensor at the second time point, and the fourth signal output by the optical sensor at the fourth time point are collected by resetting each optical sensor at the first time point; and the optical sensor is reset at the fifth time point to restore the signal output by the optical sensor as the first signal. Since the first time point and the second time point are both located before the pixel unit corresponding to the position of the optical sensor performs display, no error occurs to the collected first signal and second signal. In addition, after the optical sensor is reset at the fifth time point, the optical sensor may receive light and accumulate charges again on basis of the first signal, so that the fourth signal output by the optical sensor at the fourth time point will not be affected by the phenomenon of coupling and has no error. Hence, a first difference value between the first signal and the second signal and a second difference value between the first signal and the fourth signal are obtained, and the sum of the first difference value and the second difference value can represent the variation of the optical signal detected by the optical sensor in the current cycle. Therefore, the sum of the first difference value and the second difference value is determined as the signal variation amount in the current cycle, so that errors in the collected signal variation amount can be avoided, and accuracy of the signal detection can be improved, which thereby improves the accuracy of fingerprint identification.

Figure 10:
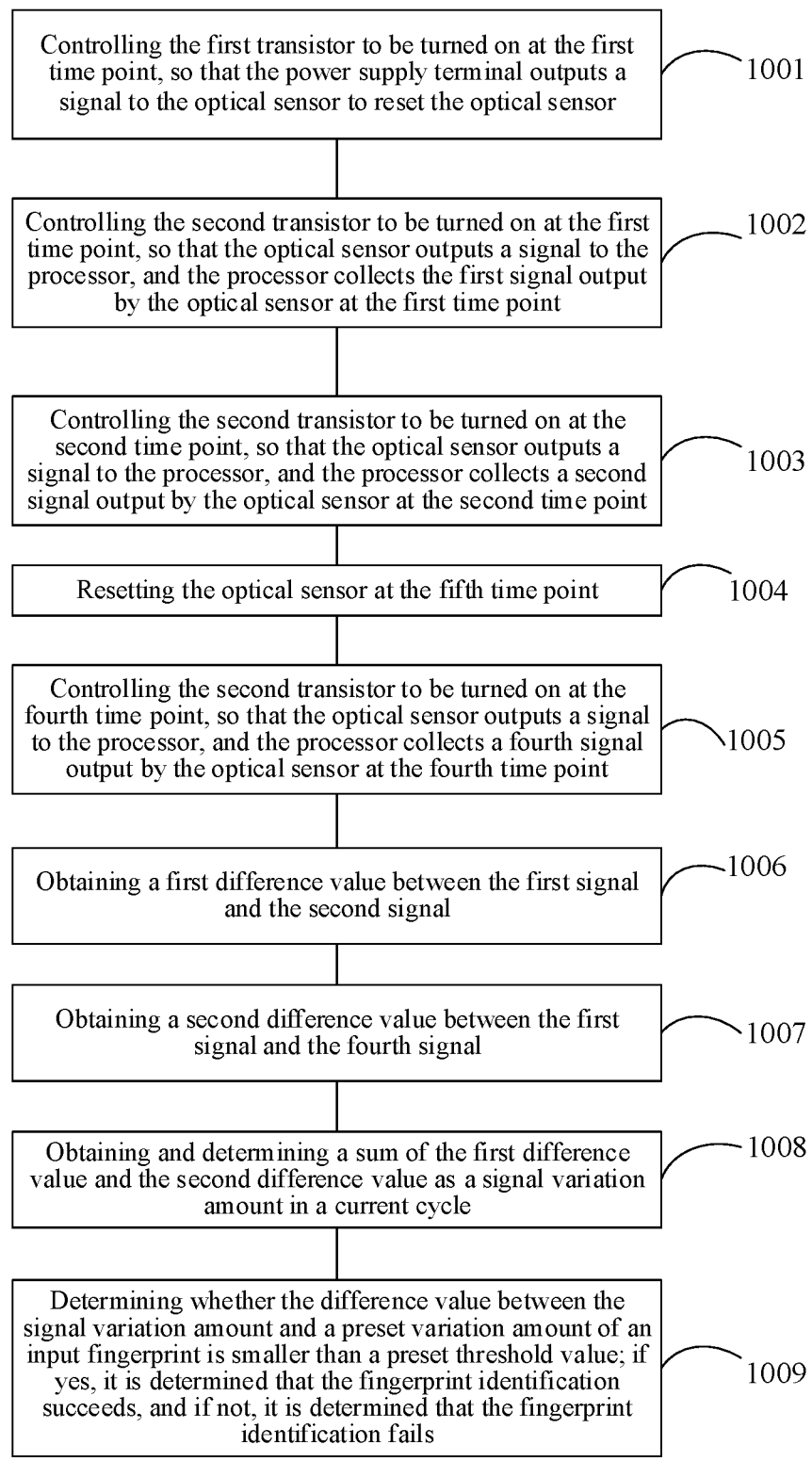
FIG. 10 is a flow chart of a signal detection method according to an exemplary embodiment.

FIG. 10 is a flow chart of a signal detection method according to an exemplary embodiment. The method is applied in the electronic device, and the structure of the display screen of the electronic device is as shown in FIG. 2. The method includes following steps.

In step 1001, the first transistor is controlled to be turned on at the first time point, so that the power supply terminal outputs a signal to the optical sensor to reset the optical sensor.

In step 1002, the second transistor is controlled to be turned on at the first time point, so that the optical sensor outputs a signal to the processor, and the processor collects the first signal output by the optical sensor at the first time point.

In step 1003, the second transistor is controlled to be turned on at the second time point, so that the optical sensor outputs a signal to the processor, and the processor collects a second signal output by the optical sensor at the second time point.

Steps 1001 to 1003 are similar to steps 401 to 403 in the aforesaid embodiment, and will not be described herein again.

In step 1004, the optical sensor is reset at the fifth time point.

Step 1004 is similar to step 401 in the aforesaid embodiment, and will not be described herein again.

In step 1005, the second transistor is controlled to be turned on at the fourth time point, so that the optical sensor outputs a signal to the processor, and the processor collects a fourth signal output by the optical sensor at the fourth time point.

In step 1006, a first difference value between the first signal and the second signal is obtained.

Steps 1005 to 1006 are similar to steps 405 to 406 in the aforesaid embodiment, and will not be described herein again.

In step 1007, a second difference value between the first signal and the fourth signal is obtained.

Since the signal output by the optical sensor is restored to the first signal when the reset operation is performed at the fifth time point, the error caused by the phenomenon of signal coupling is eliminated. After that, the optical sensor may receive light and accumulate charges again on basis of the first signal, so that the signal output by the optical sensor will not be affected by the phenomenon of coupling. Thus, no error will occur in collecting the fourth signal output by the optical sensor at the fourth time point. In addition, the second difference between the first signal and the fourth signal is the signal variation amount of the optical sensor in a period from the fifth time point to the fourth time point.

In the aforesaid embodiment, after resetting the optical sensor at the fifth time point, the processor collects the third signal at the third time point. In the embodiment of the present disclosure, the third signal will not be collected any more, and the first signal at the first time point is adopted to replace the third signal for subsequent calculation, which reduces the calculation amount and power consumption.

It should be noted that steps 1006-1007 are executed after steps 1002-1005 only in this embodiment of the present disclosure. In another embodiment, step 1006 can be executed after steps 1002-1003, step 1007 can be executed after steps 1004-1005, or steps 1006 and 1007 can be executed simultaneously after steps 1002-1005.

In step 1008, a sum of the first difference value and the second difference value is obtained and determined as a signal variation amount in a current cycle.

In step 1009, it is determined whether the difference value between the signal variation amount and a preset variation amount of an input fingerprint is smaller than a preset threshold value; if yes, it is determined that the fingerprint identification succeeds, and if not, it is determined that the fingerprint identification fails.

Steps 1008 to 1009 are similar to steps 408 to 409 in the aforesaid embodiment, and will not be described herein again.

It should be noted that the embodiment of the present disclosure is only described with respect to performing a reset operation on the optical sensor at the fifth time point in the current cycle. In practical applications, the electronic device may further perform two or more reset operations on the optical sensor, which is not limited in the embodiment of the present disclosure.

In the method provided by the embodiment of the present disclosure, the first signal output by the optical sensor at the first time point, the second signal output by the optical sensor at the second time point, and the fourth signal output by the optical sensor at the fourth time point are collected by resetting each optical sensor at the first time point; and the optical sensor is reset at the fifth time point to restore the signal output by the optical sensor as the first signal. Since the first time point and the second time point are both located before the pixel unit corresponding to the position of the optical sensor performs display, no error occurs to the collected first signal and the second signal. In addition, after the optical sensor is reset at the fifth time point, the optical sensor may receive light and accumulate charges again on basis of the first signal, so that the fourth signal output by the optical sensor at the fourth time point will not be affected by the phenomenon of coupling and has no error. Hence, a first difference value between the first signal and the second signal and a second difference value between the first signal and the fourth signal are obtained, and the sum of the first difference value and the second difference value can represent the variation of the optical signal detected by the optical sensor in the current cycle. Therefore, the sum of the first difference value and the second difference value is determined as the signal variation amount in the current cycle, so that errors in the collected signal variation amount can be avoided, and accuracy of the signal detection can be improved, which thereby improves the accuracy of fingerprint identification.

Figure 11:
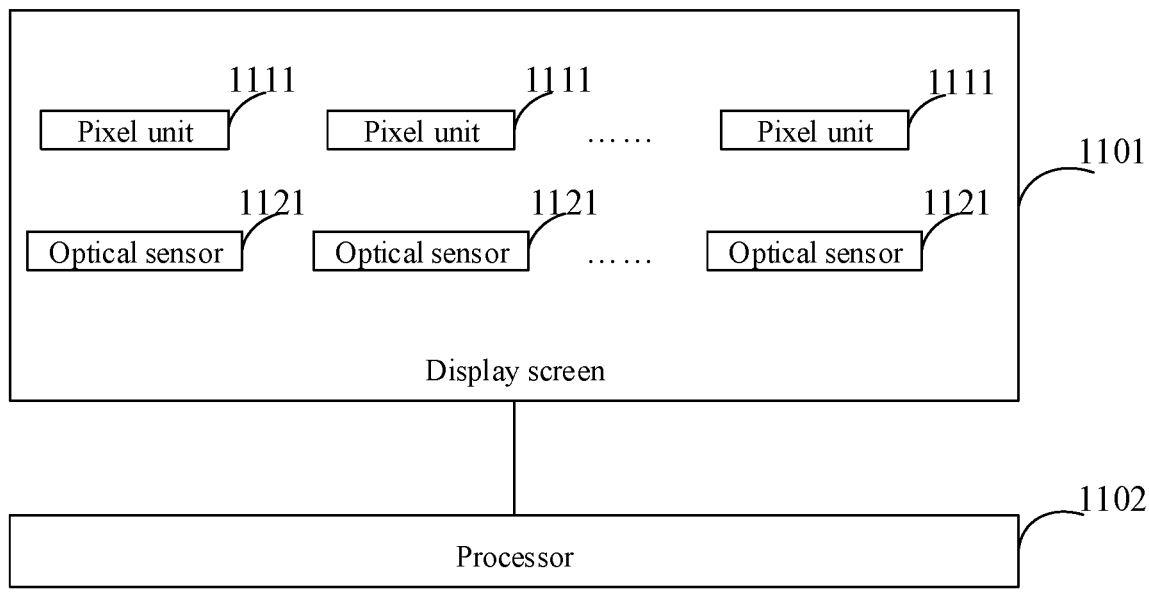
FIG. 11 is a schematic diagram of a structure of an electronic device according to an exemplary embodiment.

FIG. 11 is a schematic diagram of a structure of an electronic device according to an exemplary embodiment. The electronic device includes a display screen 1101 and a processor 1102. The display screen 1101 includes a plurality of pixel units 1111 and a plurality of optical sensors 1121, and positions of the plurality of pixel units 1111 correspond to positions of the plurality of optical sensors 1121 one to one.

The processor 1102 is configured to:

reset each optical sensor 1121 at a first time point;

collect a first signal output by the optical sensor 1121 at the first time point, a second signal output by the optical sensor 1121 at a second time point, a third signal output by the optical sensor 1121 at a third time point, and a fourth signal output by the optical sensor 1121 at a fourth time point;

obtain a first difference value between the first signal and the second signal, and a second difference value between the third signal and the fourth signal, and determine the sum of the first difference value and the second difference value as the signal variation amount in the current cycle.

Herein, the first time point is a starting time point of the current cycle, and the fourth time point is an ending time point of the current cycle; the second time point is a time point in the current cycle before a pixel unit 1111 corresponding to the position of the optical sensor 1121 performs display; and the third time point is a time point in the current cycle after the pixel unit 1111 performs display.

Figure 12:
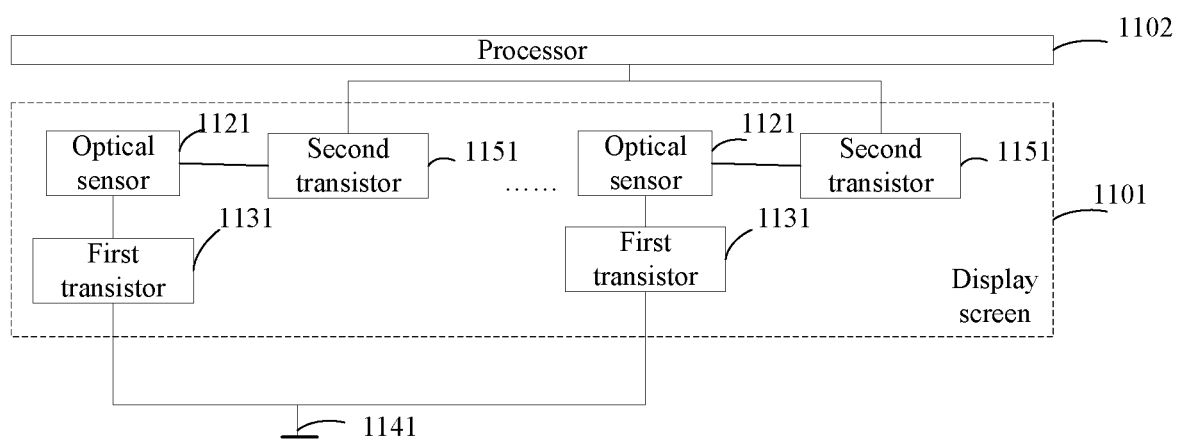
FIG. 12 is a schematic diagram of a structure of another electronic device according to an exemplary embodiment.

In one embodiment, as shown in FIG. 12, the processor 1102 is further configured to reset the optical sensor 1121 at the fifth time point. The fifth time point, which is after the pixel unit 1111 performs display, is a time point before the third time point in the present current cycle.

In one embodiment, referring to FIG. 12, the display screen 1101 further includes a first transistor 1131. The optical sensor 1121 is connected to the first transistor 1131, and the first transistor 1131 is connected to a power supply terminal 1141.

The processor 1102 is further configured to control the first transistor 1131 to be turned on at the first time point, so that the power supply terminal 1141 outputs a signal to the optical sensor 1121 to reset the optical sensor 1121.

In one embodiment, as shown in FIG. 12, the display screen further includes a second transistor 1151 and a processor 1102. The optical sensor 1121 is connected to the second transistor 1151, and the second transistor 1151 is connected to the processor 1102.

The processor 1102 is further configured to control the second transistor 1151 to be turned on at the first time point, the second time point, the third time point and the fourth time point, so that the optical sensor 1121 outputs a signal to the processor 1102, and the processor 1102 collects the signal at the current time point.

In one embodiment, as shown in FIG. 12, the processor 1102 is further configured to:

determine that the fingerprint identification succeeds when the difference value between the signal variation amount and a preset variation amount of an input fingerprint is smaller than a preset threshold value; and determine that the fingerprint identification fails when the difference value between the signal variation amount and the preset variation amount is not smaller than the preset threshold value.

Figure 13:
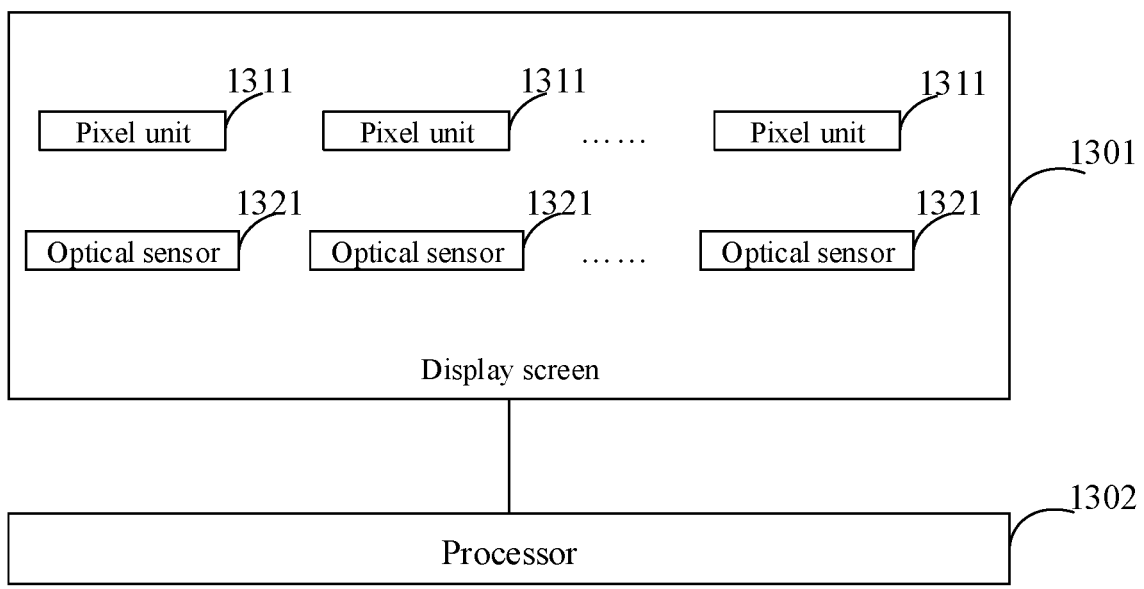
FIG. 13 is a schematic diagram of a structure of an electronic device according to an exemplary embodiment.

FIG. 13 is a schematic diagram of a structure of an electronic device according to an exemplary embodiment. The electronic device includes a display screen 1301 and a processor 1302. The display screen 1301 includes a plurality of pixel units 1311 and a plurality of optical sensors 1321, and positions of the plurality of pixel units 1311 correspond to positions of the plurality of optical sensors 1321 one to one.

The processor 1302 is configured to:

reset each optical sensor 1321 at a first time point;

collect a first signal output by the optical sensor 1321 at the first time point, and a second signal output by the optical sensor 1321 at a second time point;

reset the optical sensor 1321 at a fifth time point;

collect a fourth signal output by the optical sensor 1321 at a fourth time point; and obtain a first difference value between the first signal and the second signal and a second difference value between the first signal and the fourth signal, and determine the sum of the first difference value and the second difference value as the signal variation amount in the current cycle.

Herein, the first time point is a starting time point of the current cycle, and the fourth time point is an ending time point of the current cycle; the second time point is a time point in the current cycle before a pixel unit 1311 corresponding to the position of the optical sensor 1321 performs display; and the fifth time point is a time point in the current cycle after the pixel unit 1311 performs display.

The above descriptions are only for facilitating the understanding of the technical solutions of the present disclosure by those skilled in the art, and are not intended to limit the present disclosure. Within the spirit and principles of the disclosure, any modifications, equivalent substitutions, improvements, etc., are within the protection scope of the present disclosure.

What is claimed is:

1. A signal detection method, comprising:

resetting, by an electronic device having a display screen comprising a plurality of pixels and a plurality of optical sensors, each optical sensor at a first time point, wherein positions of the plurality of pixels are in one-to-one accordance with positions of the plurality of optical sensors;

collecting, by the electronic device, a first signal output by an optical sensor at the first time point, a second signal output by the optical sensor at a second time point, a third signal output by the optical sensor at a third time point, and a fourth signal output by the optical sensor at a fourth time point; and obtaining, by the electronic device, a first difference value between the first signal and the second signal and a second difference value between the third signal and the fourth signal, and determining, by the electronic device, a sum of the first difference value and the second difference value as a signal variation amount in a current cycle, wherein the first time point is a starting time point of the current cycle, the fourth time point is an ending time point of the current cycle, the second time point is a time point in the current cycle before a pixel corresponding to a position of the optical sensor performs display, the third time point is a time point in the current cycle after the pixel displays, the first difference value between the first signal and the second signal is obtained before displaying the pixel corresponding to the position of the optical sensor, and the second difference value between the third signal and the fourth signal is obtained after displaying the pixel corresponding to the position of the optical sensor.

2. The method according to claim 1, further comprising: resetting, by the electronic device, the optical sensor at a fifth time point, wherein the fifth time point is a time point after the pixel displays and before the third time point in the current cycle.

3. The method according to claim 1, wherein the display screen further comprises a first transistor connected to the optical sensor and a power supply terminal; and resetting, by the electronic device, each optical sensor at the first time point comprises:

turning on the first transistor at the first time point, so that the power supply terminal outputs a signal to the optical sensor to reset the optical sensor.

4. The method according to claim 1, wherein the display screen further comprises a second transistor and a processor, the second transistor connecting to the optical sensor and the processor; and collecting, by the electronic device, the first signal output by the optical sensor at the first time point, the second signal output by the optical sensor at the second time point, the third signal output by the optical sensor at the third time point, and the fourth signal output by the optical sensor at the fourth time point comprises:

turning on the second transistor at the first time point, the second time point, the third time point, and the fourth time point, so that the optical sensor outputs a signal to the processor, and the processor collects a signal at a current time point.

5. The method according to claim 1, further comprising: upon determining that a difference value between the signal variation amount and a preset variation amount of an input fingerprint is less than a preset threshold value, determining, by the electronic device, that fingerprint identification succeeds; and upon determining that the difference value between the signal variation amount and the preset variation amount is not less than the preset threshold value, determining, by the electronic device, that the fingerprint identification fails.

6. An electronic device, comprising:

a display screen comprising a plurality of pixels and a plurality of optical sensors, positions of the plurality of pixels in one-to-one accordance with positions of the plurality of optical sensors, one or more processors;

a non-transitory storage coupled to the one or more processors; and a plurality of programs stored in the non-transitory storage that, when executed by the one or more processors, cause the electronic device to:

reset each optical sensor at a first time point;

collect a first signal output by an optical sensor at the first time point, a second signal output by the optical sensor at a second time point, a third signal output by the optical sensor at a third time point, and a fourth signal output by the optical sensor at a fourth time point; and obtain a first difference value between the first signal and the second signal and a second difference value between the third signal and the fourth signal, and determine a sum of the first difference value and the second difference value as a signal variation amount in a current cycle;

wherein the first time point is a starting time point of the current cycle, the fourth time point is an ending time point of the current cycle the second time point is a time point in the current cycle before a pixel corresponding to a position of the optical sensor displays, the third time point is a time point in the current cycle after the pixel displays, the first difference value between the first signal and the second signal is obtained before displaying the pixel corresponding to the position of the optical sensor, and the second difference value between the third signal and the fourth signal is obtained after displaying the pixel corresponding to the position of the optical sensor.

7. The electronic device according to claim 6, wherein the plurality of programs cause the electronic device further to:
reset the optical sensor at a fifth time point, wherein the fifth time point is a time point after the pixel displays and before the third time point in the current cycle.

8. The electronic device according to claim 6, wherein the display screen further comprises a first transistor connected to the optical sensor and a power supply terminal; and
the plurality of programs cause the electronic device to turn on the first transistor at the first time point, so that the power supply terminal outputs a signal to the optical sensor to reset the optical sensor.

9. The electronic device according to claim 6, wherein the display screen further comprises a second transistor connecting to the optical sensor; and
the plurality of programs cause the electronic device further to turn on the second transistor at the first time point, the second time point, the third time point, and the fourth time point, so that the optical sensor outputs a signal to the electronic device, and the electronic device collects the signal at a current time point.

10. The electronic device according to claim 6, wherein the plurality of programs cause the electronic device further to:
upon determining that a difference value between the signal variation amount and a preset variation amount of an input fingerprint is less than a preset threshold value, determine that fingerprint identification succeeds; and
upon determining that the difference value between the signal variation amount and the preset variation amount is not less than the preset threshold value, determine that the fingerprint identification fails.

\* \* \* \* \*